United States Patent [19]
Mulligan et al.

[11] Patent Number: 5,803,142
[45] Date of Patent: Sep. 8, 1998

[54] DEBARKING AND CHIPPING FOLDED WHOLE-TREES

[75] Inventors: David Dwight Mulligan; James Ernest Salyers, both of Covington, Va.

[73] Assignee: Westvaco Corporation, New York, N.Y.

[21] Appl. No.: 925,268

[22] Filed: Sep. 8, 1997

[51] Int. Cl.$^6$ .................................. B27L 5/02; B27L 1/00
[52] U.S. Cl. .................... 144/369; 144/3.1; 144/208.1; 144/242.1; 144/246.1; 144/341; 144/367; 144/337; 209/3; 241/24.1
[58] Field of Search .............................. 209/3, 250, 284, 209/290, 291; 144/3.1, 208.1, 208.4, 208.91, 343, 24.13, 340, 341, 367, 369, 246.1, 248.5, 337; 241/40, 79.1, 28, 56, 235, 236, 24.1

[56] References Cited

U.S. PATENT DOCUMENTS

| | | |
|---|---|---|
| 2,783,795 | 3/1957 | Andrus, et al. ..................... 144/208.91 |
| 2,847,045 | 8/1958 | Brown ................................ 144/208.91 |
| 3,286,747 | 11/1966 | Delcellier . |
| 3,299,919 | 1/1967 | Saresvuo . |
| 3,576,203 | 4/1971 | Cote . |
| 3,661,333 | 5/1972 | Smith ..................................... 241/281 |
| 3,746,063 | 7/1973 | Smiltneek . |
| 3,955,608 | 5/1976 | Smiltneek . |
| 3,963,064 | 6/1976 | Hayes . |
| 4,043,901 | 8/1977 | Gauld . |
| 4,140,281 | 2/1979 | Fulghum, Jr. et al. . |
| 4,176,239 | 11/1979 | Reiche . |
| 4,332,353 | 6/1982 | Lario et al. . |
| 4,774,987 | 10/1988 | Sepling . |
| 4,911,215 | 3/1990 | Phipps . |
| 5,005,621 | 4/1991 | Woodham . |
| 5,019,123 | 5/1991 | Clarke-Pounder et al. . |
| 5,044,412 | 9/1991 | Price et al. . |
| 5,097,880 | 3/1992 | Pousette . |
| 5,193,597 | 3/1993 | Strong . |
| 5,247,978 | 9/1993 | Silenius et al. . |
| 5,249,613 | 10/1993 | Ridler . |
| 5,349,999 | 9/1994 | Peterson et al. . |
| 5,394,912 | 3/1995 | Hume . |
| 5,458,172 | 10/1995 | Rautio . |
| 5,474,186 | 12/1995 | Fulghum, Jr. et al. . |
| 5,524,685 | 6/1996 | Barnhill et al. . |
| 5,673,865 | 10/1997 | Stroulger ................................. 144/341 |

FOREIGN PATENT DOCUMENTS 1150552  7/1983  Canada .

OTHER PUBLICATIONS

Pentti Hakkila et al, Production, Harvesting and Utilization of Small–Sized Trees, Helsinki 1979, pp. 108–112.
Procédé industriel de nettoyage des copeaux vents, Oct. 1979, pp. 50–51, with a 5 page attachment.

*Primary Examiner*—W. Donald Bray
*Attorney, Agent, or Firm*—J. R. McDaniel; R. L. Schmalz

[57] ABSTRACT

This invention relates to debarking and chipping folded whole trees. Such structures of this type, generally, increase wood recovery by making high-quality chips out of tree tops, branches, as well as, other larger portions of the tree.

12 Claims, 9 Drawing Sheets

DEBARKING AND CHIPPING FOLDED WHOLE-TREES

BACKGROUND OF THE INVENTION

1. Field of the Invention

This invention relates to debarking and chipping folded whole trees. Such structures of this type, generally, increase wood recovery by making high-quality chips out of tree tops, branches, as well as, other larger portions of the tree.

2. Description of the Related Art

Typically, particularly for hardwood, only stems/boles of trees plus fairly straight, large-diameter branches are economically recovered as "roundwood" for use by the paper pulp mills. This roundwood is debarked in a woodyard using a debarking drum that drops and rubs logs together. Also, a pulp mill's low-bark content wood source can often be saw mill chips that are made from residue by ring-debarking individual high-quality logs.

The only commercial wood chip product which increases wood harvesting/acre vs. roundwood harvesting is whole-tree chips (WTC). WTC have high bark-content unless chipping of the cut tree is preceded by chain-flailing. Unfortunately, chain-flailing is generally only economical for large-scale, flat land harvesting where cut trees can be brought to the necessary array of grapples, chain flailers, whole-tree chippers and chip vans.

Exemplary of such prior art is U.S. Pat. No. 3,963,064 ('064) to G. T. Hayes, entitled "Processing Whole Trees", U.S. Pat. No. 5,193,597 ('597) to D. E. Strong, entitled "Material Stripper and Debris Removal Apparatus Therefor", and U.S. Pat. No. 5,394,912 ('912) to A. C. Hume, entitled "Wood Fibre Debris Processor". In particular, the '912 and '597 references disclose devises to treat wood fiber debris by stripping it from logs. The '064 reference teaches the modification of a conventional log-drum debarker to allow its use on tree tops and branches. The '912 reference also discloses the use of a set of studded rolls in a trough with no means to fold branches so the wood must be straight or only modestly curved. Finally, the '064 reference teaches that the tree, preferably soft wood trees with small limbs, must be packed without de-limbing or topping the tree in a drum debarker. Therefore, a more advantageous system, then, would be presented if whole-trees could be folded and chipped in one process.

It is apparent from the above that there exists a need in the art for a system which folds and chips whole-trees, and which at least equals the performance characteristics of the known whole-tree chippers, but which at the same time is capable of performing all of the necessary steps in one system. It is the purpose of this invention to fulfill this and other needs in the art in a manner more apparent to the skilled artisan once given the following disclosure.

SUMMARY OF THE INVENTION

Generally speaking, this invention fulfills these needs by providing an apparatus for folding and chipping whole-trees, comprising a barky whole-tree infeed means, a bark removal means located adjacent to the infeed means wherein the bark removal means includes a plurality of toothed rollers having a nip such that teeth from one of the plurality of rollers are positioned in an area between teeth of the other of the plurality of rollers, a debarked whole-tree outfeed means located adjacent to the bark removal means, and a whole-tree chipping means located adjacent to the outfeed means.

In certain preferred embodiments, the whole-tree infeed and outfeed means are shelves. Also, the bark removal means crushes and splits the whole-tree and acts as a self-feeding device once a portion of the whole-tree is grasped by the bark removal means. Finally, the whole-tree chipping means is a drum chipper.

In another further preferred embodiment, the apparatus for folding and chipping whole-trees addresses the goal of recovering more fiber/acre from the forests and making high-quality chips out of tree tops, branches, as well as, the other commonly used portions of the whole-tree.

The preferred apparatus, according to this invention, offers the following advantages: lightness in weight; good stability; good durability; excellent economy; excellent debarking; excellent chipping; and high strength for safety. In fact, in many of the preferred embodiments, these factors of debarking, chipping and economy are optimized to an extent that is considerably higher than heretofore achieved in prior, known debarking/chipping apparatus.

The above and other features of the present invention, which become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
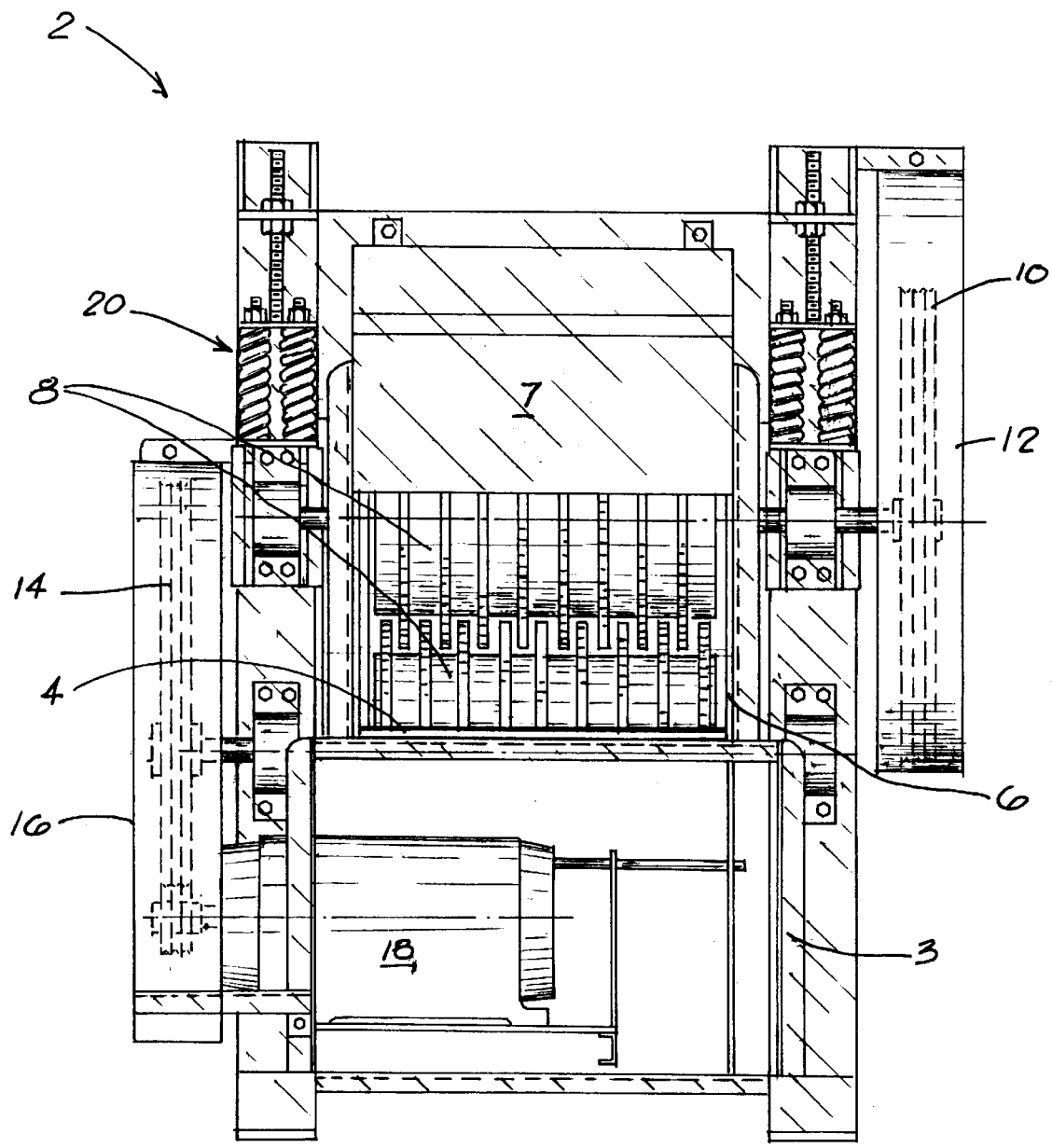
FIG. 1 is a front-view of an apparatus for folding and chipping whole-trees, according to the present invention.

With reference first to FIG. 1, there is illustrated an advantageous environment for use of the concepts of this invention. In particular, FIG. 1 illustrates apparatus 2 for folding and chipping whole-trees. Apparatus 2 includes, in part, frame 3, infeed shelf 4, side walls 6, upper wall 7, rollers 8, drive mechanism 10, safety shield 12, drive mechanism 14, safety shield 16, drive motor 18, and roller adjustment mechanism 20.

Figure 2:
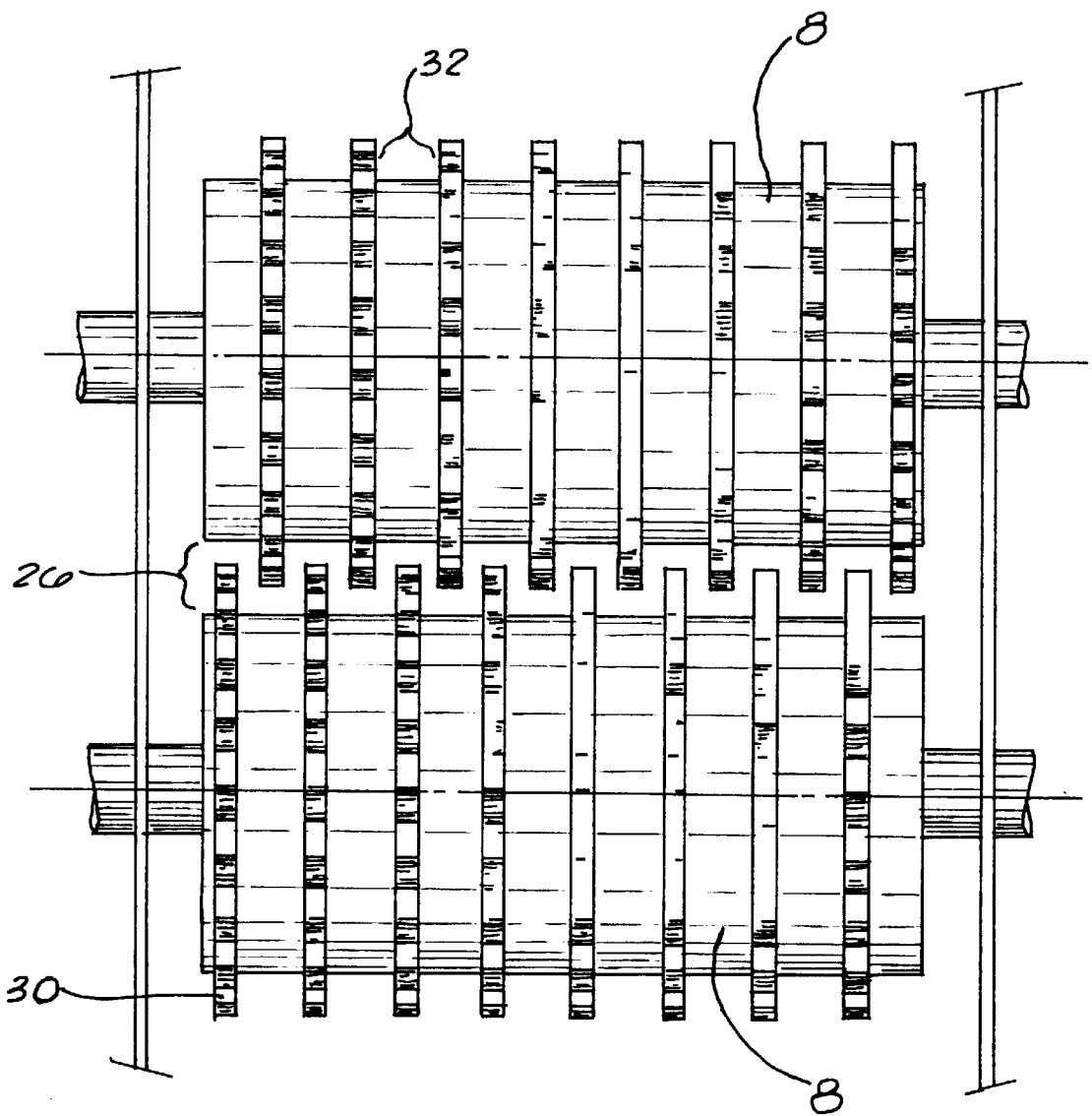
FIG. 2 is an illustration of the rollers of the apparatus for folding and chipping whole-trees, according to the present invention.
Figure 4:
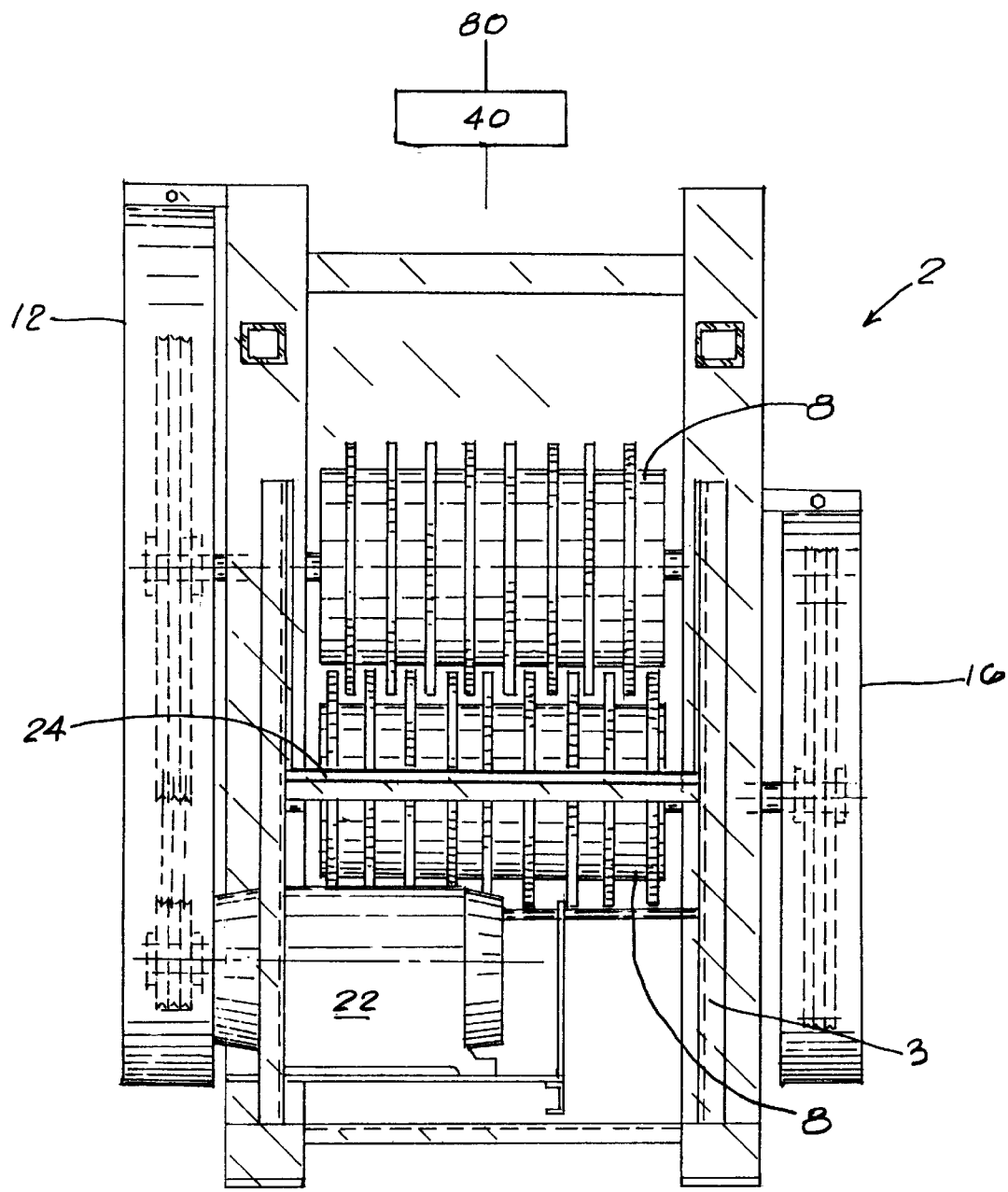
FIG. 4 is a rear-view of the apparatus for folding and chipping whole-trees, according to the present invention.

Preferably, frame 3, shelf 4, side walls 6 and upper wall 7 are constructed of any suitable durable, metallic material. Rollers 8, preferably, have an effective diameter of at least 24 inches. Also, rollers 8 are studded with rows of buttressed teeth with the teeth in one row rotating through and between the tooth space on the other row (FIG. 2). Drive mechanisms 10 and 14 are conventional pulleys connected by a conventional belt drive to the drive motors. As shown in FIG. 1, drive mechanism 14 is connected to drive motor 18. Also, drive mechanism 10 is connected to drive motor 22 (FIG. 4). Finally, shields 12 and 16 are conventionally constructed of any durable suitable, metallic material.

Figure 6:
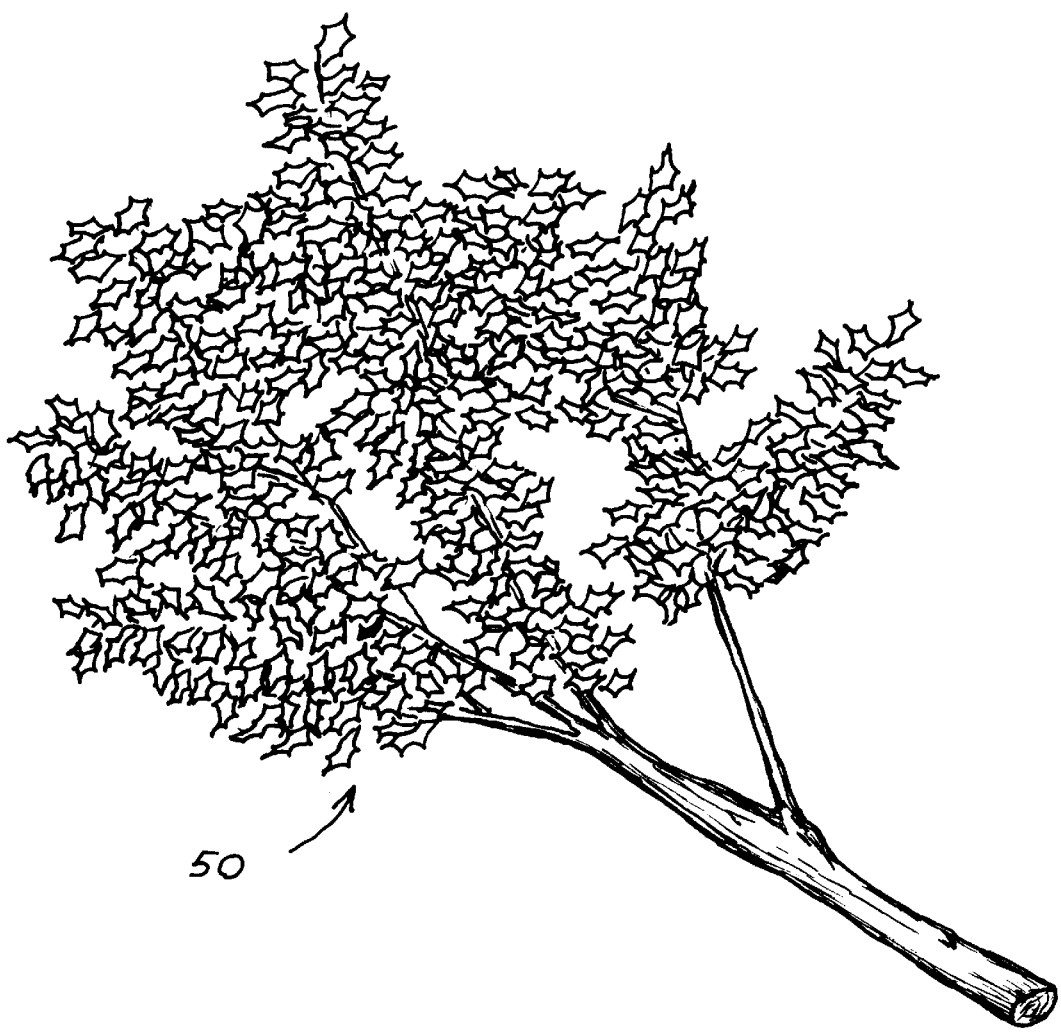
FIG. 6 is an illustration of a whole-tree prior to folding and chipping.

With respect to FIG. 2, rollers 8 are more clearly illustrated. In particular, the design of teeth 30 offer three types of action for reducing wooden biomass or whole-tree 50 (FIG. 6). The biomass 50 is first crushed by the pressure between rollers 8. The buttressed teeth 30 crimp biomass 50 being processed at predetermined intervals along its length. The interlocking nature of teeth 30 cause the biomass 50 to be rent or split as teeth 30 on one roller 8 force biomass 50 down into gap 32 between teeth 30 of rollers 8.

The feed rate of barky limbs, tops and branches can be adjusted to match the material being produced for 24 inch diameter rollers. For example, rollers 8 revolve at a speed of, preferably, 200 to 300 rpm, resulting in a throughput rate of 1,200–1,500 feet/minute. The design of teeth 30 causes apparatus 2 to be self-feeding once a portion of biomass 50 is grasped. The remainder of biomass 50 is pulled into apparatus 2 by a positive motion as the crushing proceeds.

It is important to note that trials in the laboratory have demonstrated that apparatus 2 performs best when biomass 50 is fed in top first. The feed action causes limbs to be folded back along with stems prior to crushing, which expedites the processing; and the crushing is much more homogeneous when it proceeds from the narrowest dimension of the stem toward the thickest.

Figure 3:
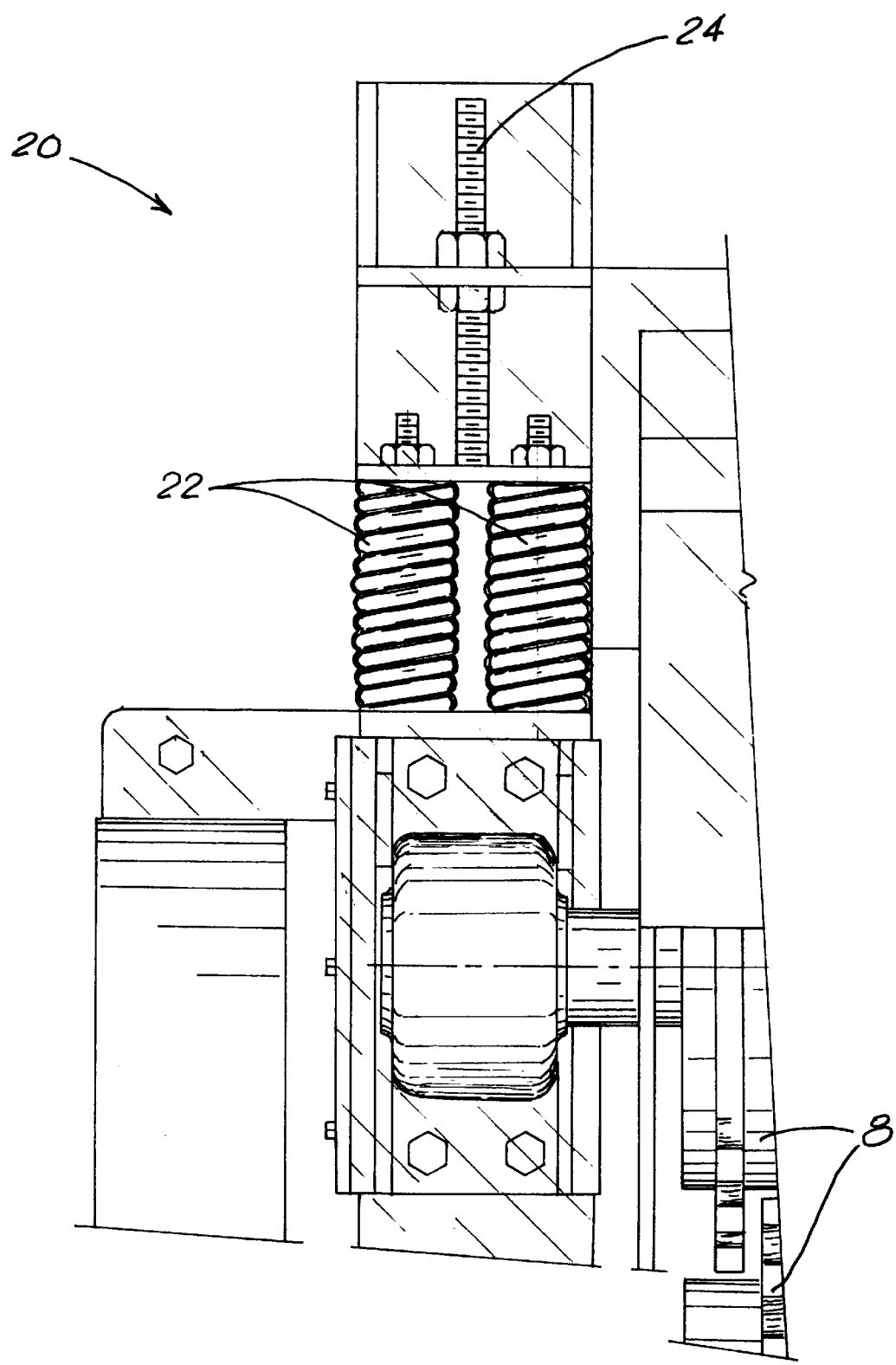
FIG. 3 is a front-view of a roller adjustment for the apparatus for folding and chipping whole-trees, according to the present invention.

FIG. 3 illustrates adjustment mechanism 20. In particular, adjustment mechanism 20 includes, in part, conventional springs or hydraulic cylinders 22, threaded adjusting device 24 and nip 26. Operationally, threaded device 24 is turned so that the force of springs or hydraulic cylinders 22 can be increased/decreased in order to adjust the width of nip 26 between rollers 8.

FIG. 4 illustrates a rear view of apparatus 2. More particularly, conventional motor 22, outfeed shelf 24, conventional drum debarker 40 and chips 80 are illustrated.

Figure 5:
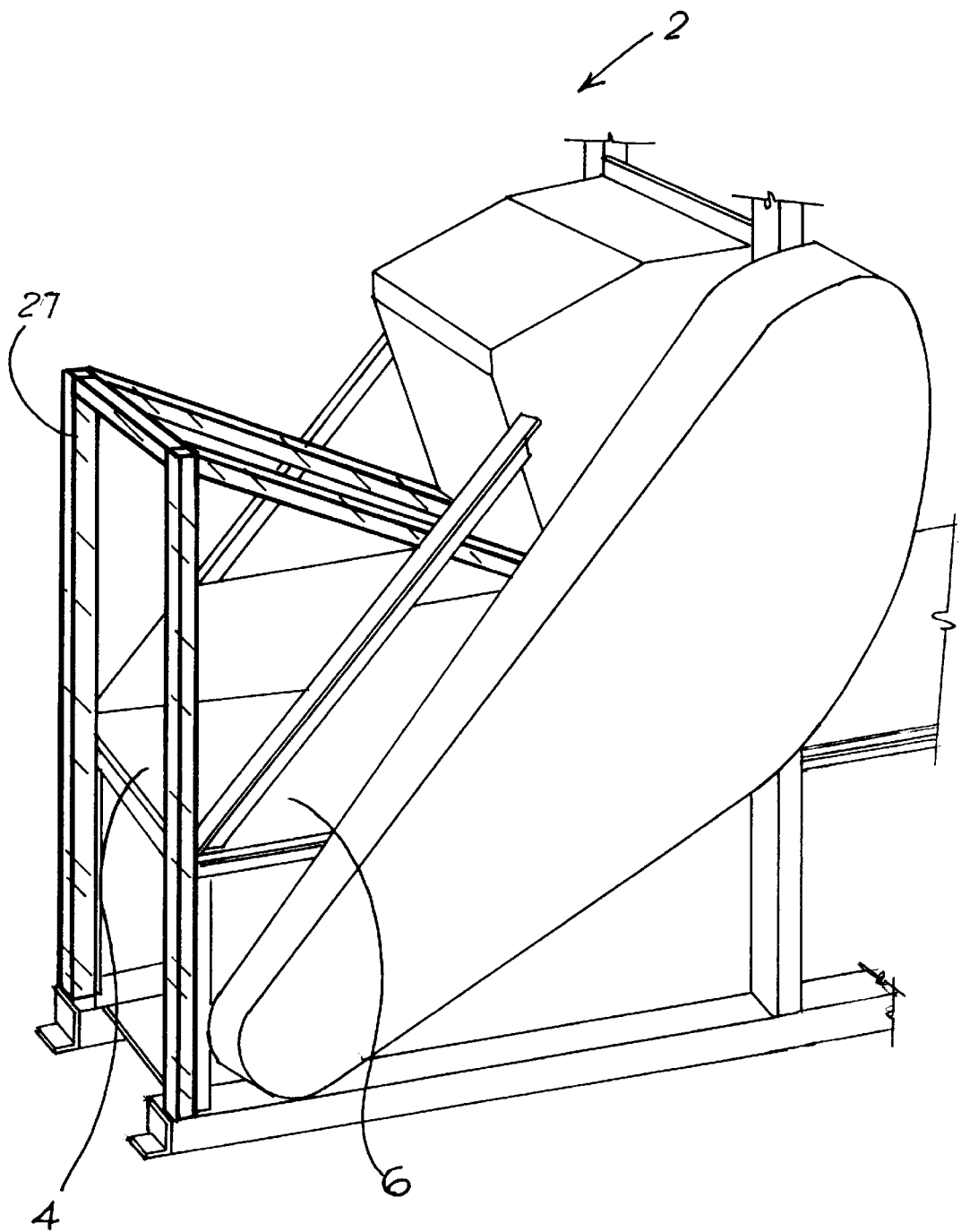
FIG. 5 is an isometric view of the safety bar-frame for the apparatus for folding and chipping whole-trees, according to the present invention.

It is to be understood that further safety devices can be added to apparatus 2 in order to improve the safe operation of apparatus 2. In particular, as shown in FIG. 5, safety bar-frame 27 can be rigidly attached by conventional techniques to infeed shelf 4 and side wall 6 in order to decrease the likelihood that the hands of the operator will be introduced into apparatus 2 during the operation of apparatus 2.

FIG. 6 illustrates a typical woody biomass 50 which includes the stem and trunk of a tree, along with branches and the leaves.

Figure 7:
FIG. 7 is an illustration of a whole-tree which has been folded by the apparatus for folding and chipping whole-trees, according to the present invention.

FIG. 7 shows what woody biomass 50 looks like after it has been debarked by apparatus 2. In particular, what remains is a woody biomass 60 in which the bark of biomass 60 has been skinned and the leaves and other very small branches of biomass 50 have been removed.

Figure 8:
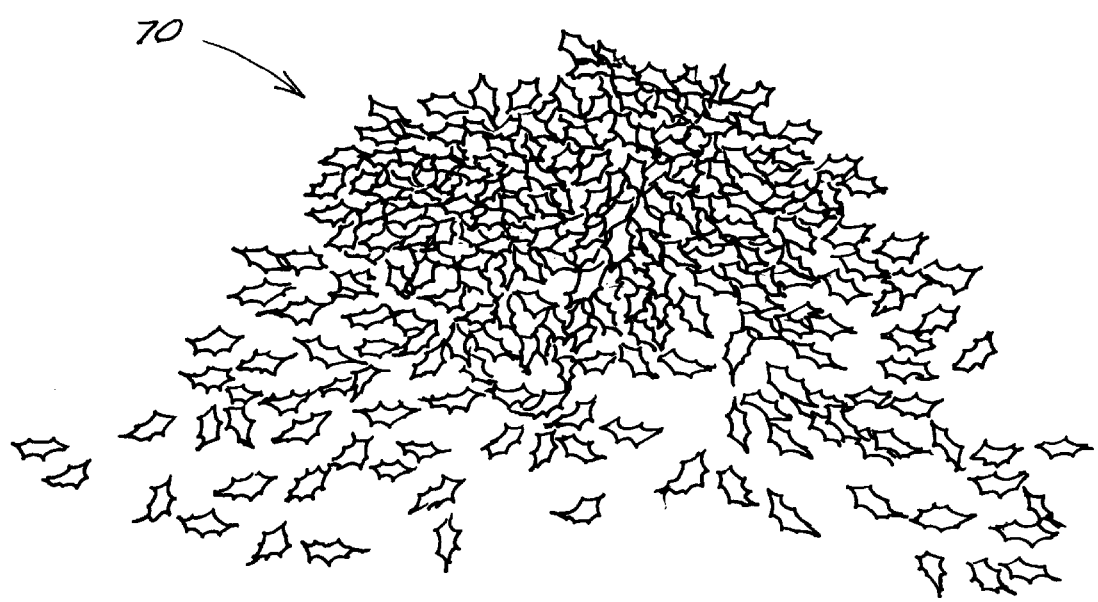
FIG. 8 is an illustration of the debris removed from a folded whole-tree by the apparatus for folding and chipping whole-trees, according to the present invention.

As shown in FIG. 8, the residue 70 of woody biomass 50 is illustrated. This residue 70 includes the leaves and very small branches of woody biomass 50.

Figure 9:
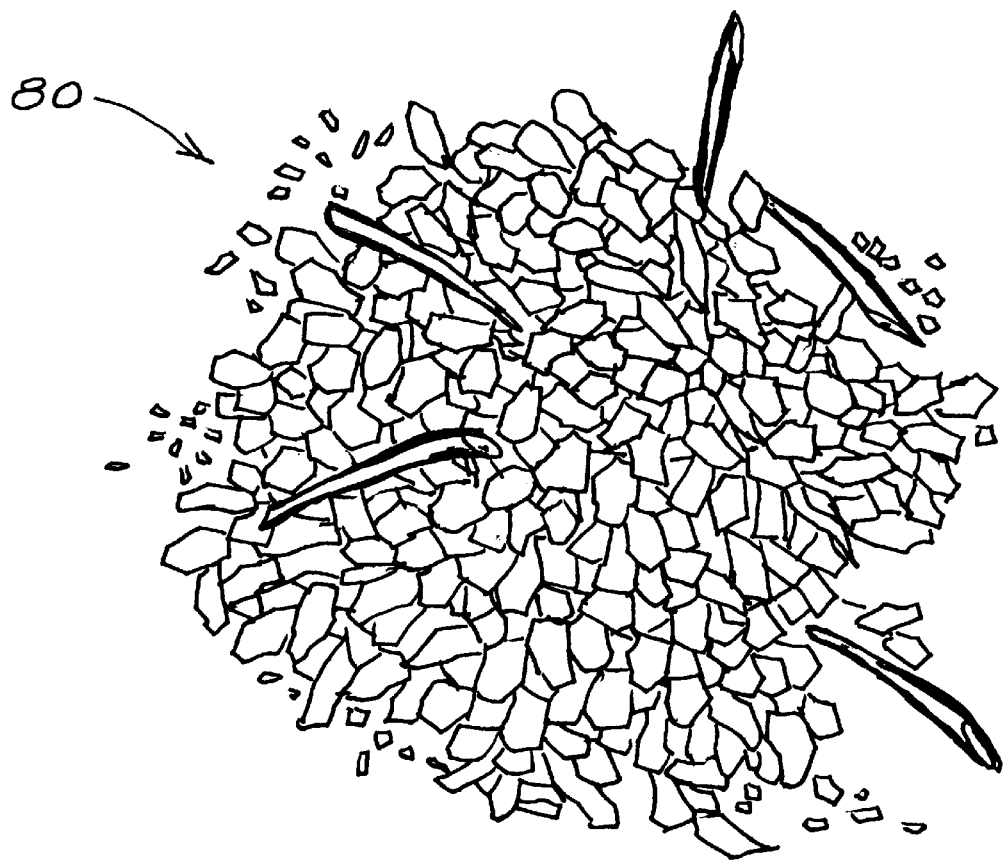
FIG. 9 is an illustration of whole-tree chips produced from the apparatus for folding and chipping whole-trees, according to the present invention.

Finally, after woody biomass 60 has been treated by apparatus 2, woody biomass 60 is subjected to wood chipping by a conventional drum chipper 40. As shown in FIG. 9, drum chipper 40 creates wood chips 80. It is important to note that wood chips 80 include wood chips, as well as, small, chipped round wood due to the chipping of the branches, as well as, the trunk or stem of biomass 50.

The following test results more clearly substantiate the novelty of the present invention:

SUMMARY

Drum chipping seems more suitable than disk chipping for small branches. The drum process avoids the need to constrict branches into a bundle and force-feed them end-on to the chipper throat. Drum-chipped branches are also usually in chip form, rather than in sliver form which is advantageous when producing pulp from the chips.

Skinning branches once by apparatus 2 and then turning them 90 degrees for a second skinning pass through apparatus 2, yields twice-skinned branches that are very amenable to densifying operations, such as, folding. These twice-skinned branches also debark easily in later handling since skinning disrupts the bark.

Chips made from branches by drum chipper 40 were thick but slightly tapered, reflecting gouging action of small knives on wood. Drum chip sizes were classified by conventional techniques. Starting with 20–40% bark level branches, chips made from twice-skinned branches showed an unscreened outer bark level of only 4–6% vs. 8–12% for unskinned control chips. Bark level for chips from twice-skinned branches fell to 3–4% bark with fines and pins removed. These bark levels were due partly to two operational factors:

(1) Easier bark removal from fresh branches in the early Spring; and (2) Rejection of much of the barkiest material, such as small twigs, during chipping. The barky twig, etc. rejection was achieved by omission of the usual anvil by-pass rechipping screen for the drum chipper.

Quantitative Analyses of Drum Chipper Chips

Tables 1 and 2 show that outer bark levels for drum chipper chips ranged from 4–12%. This was much lower than for disk chipper chips where 15–25% outer bark levels were common.

Looking at the entire set of drum chip samples, skinning impact was obvious:
(1) Unskinned control branches: 8–12% bark
(2) Single-skinned test branches: 6–10%, and
(3) Twice-skinned test branches: 4–6% bark.
Thus, twice-skinning reduced bark level 50% vs. unskinned control branches.

If the drum-made chips were further separated from pins and fines, the bark levels were reduced even more. For example, twice-skinned branch chips without pins and fine had 3–4% bark.

The drum-made chips were characterized by separating aliquots of chips into three categories: (1) barky chips (having some wood and some bark), (2) clean (bark-free) or (3) free-bark (no wood at all). Table 3 categorizes drum-made chips as clean, barky or debris—the latter category being mostly free bark. This table also shows that significant bark-removal resulted from the skinning operation of the present invention.

TABLE 1

Bark Levels for Fresh-Cut Branches Chipped at 325 RPM on a Drum Chipper

| Screening | Unskinned Control | | | Once-Skinned Branches | | | Twice-Skinned Branches | | |
|---|---|---|---|---|---|---|---|---|---|
| Chip Size Class | % of Sample | % Bark | Bark Fraction | % of Sample | % Bark | Bark Fraction | % of Sample | % Bark | Bark Fraction |
| 1¾" | 0.87% | 8.40% | 0.001 | 1.44% | 7.13% | 0.001 | 1.62% | 1.34% | 0.000 |
| 8-mm | 17.87 | 4.49 | 0.008 | 23.51 | 4.19 | 0.010 | 26.11 | 3.90 | 0.010 |
| ¼" | 78.07 | 7.45 | 0.058 | 68.54 | 10.72 | 0.073 | 63.12 | 5.08 | 0.032 |
| 3⁄16" | 1.96 | 28.15 | 0.006 | 4.00 | 20.19 | 0.008 | 5.81 | 15.00 | 0.009 |
| Pan | 1.25 | 56.32 | 0.007 | 2.50 | 30.95 | 0.008 | 3.34 | 24.34 | 0.008 |
| Total Bark % | | | 8.0% | | | 10.0% | | | 5.9% |

TABLE 2

Bark Levels for Fresh-Cut Branches Chipped at 370 RPM by a Drum Chipper

| Screening | Unskinned Control | | | Once-Skinned Branches | | | Twice-Skinned Branches | | |
|---|---|---|---|---|---|---|---|---|---|
| Chip Size Class | % of Sample | % Bark | Bark Fraction | % of Sample | % Bark | Bark Fraction | % of Sample | % Bark | Bark Fraction |
| 1¾" | 0.51% | 2.72% | 0.000 | 1.80% | 3.01% | 0.001 | 3.85% | 1.90% | 0.001 |
| 8-mm | 21.18 | 8.48 | 0.018 | 23.73 | 1.89 | 0.005 | 31.66 | 2.98 | 0.009 |
| ¼" | 73.18 | 10.91 | 0.080 | 66.71 | 5.57 | 0.036 | 58.00 | 3.51 | 0.020 |
| 3⁄16" | 2.85 | 33.95 | 0.010 | 4.70 | 10.45 | 0.005 | 4.63 | 16.27 | 0.008 |
| Pan | 2.27 | 33.33 | 0.008 | 3.07 | 31.71 | 0.010 | 1.87 | 32.68 | 0.006 |
| Total Bark % | | | 11.6% | | | 5.7% | | | 4.4% |

TABLE 3

Chip Categories-"clean" = bark-free, "barky" = some wood and some bark and "debris" = all other material, e.g., free bark, splinters, etc.

| | Control % Type of Chips | | | Single Skin % Type of Chips | | | Twice Skin % Type of Chips | | |
|---|---|---|---|---|---|---|---|---|---|
| rpm | Clean | Barky | Debris | Clean | Barky | Debris | Clear | Barky | Debris |
| 325 | 44.9% | 49.7% | 4.4% | 61.6% | 34.2% | — | 72.5% | 19.7% | 7.0% |
| 370 | 54.1 | 40.4 | 4.2 | 59.1 | 34.7 | 4.1 | 68.4 | 26.3 | 4.3 |

Clearly, bark skinning, according to the present invention, addresses the goal of recovering more fiber/acre from the forest by making high-quality chips out of tree tops, branches, etc. This is especially true for hardwoods, which are inherently too bulky to be economically handled and shipped. Bark skinning overcomes this drawback by "folding" the branches around major branch sections of the wood by apparatus 2 as tops are drawn inward by the revolving action of rollers 8.

The other major drawback to chips made from tree tops, etc., is that they have inherently high bark levels: over 20% bark-content. This is overcome by the present invention in that stripping of the bark, or at least stripping it significantly, allows it to be removed during chipping. It has also been found that a particular kind of chipper, namely a drum chipper, will advantageously remove bark-content much more than the conventional disk chipper used in pulp mills.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. An apparatus for folding and chipping whole-trees, wherein said apparatus is comprised of:
   a barky whole-tree infeed means;
   a bark removal means located adjacent to said infeed means, wherein said bark removal means includes a plurality of toothed rollers having a nip such that teeth from one of the plurality of rollers are positioned in an area substantially between teeth of the other of the plurality of rollers;
   a debarked whole-tree outfeed means located adjacent to said bark removal means; and
   a whole-tree chipping means located adjacent to said outfeed means.

2. The apparatus, as in claim 1, wherein said whole-tree infeed means is comprised of:
   a first shelf means;
   a first side wall means rigidly attached to said first shelf means; and
   a top wall means rigidly attached to said first side wall means.

3. The apparatus, as in claim 2, wherein said apparatus is comprised of:
   a safety frame means rigidly attached to said first shelf means and said first side wall means.

4. The apparatus, as in claim 1, wherein said teeth in said rollers are buttressed.

5. The apparatus, as in claim 1, wherein said apparatus is comprised of:
   a nip adjustment means.

6. The apparatus, as in claim 5, wherein said nip adjustment means is comprised of:
   a spring means operatively connected to said rollers; and
   a threaded adjustor operatively connected to said spring means and said first side wall means.

7. The apparatus, as in claim 5, wherein said nip adjustment means is comprised of:
   a hydraulic means operatively connected to said rollers; and
   a threaded adjustor operatively connected to said spring means and said first side wall means.

8. The apparatus, as in claim 1, wherein said outfeed means is comprised of:
   a second shelf means; and
   a second side wall means rigidly attached to said second shelf means.

9. The apparatus, as in claim 1, wherein said chipping means is comprised of:
   a drum chipper.

10. A method of folding and chipping whole-trees, wherein said method is comprised of:
    feeding a barky whole-tree into an apparatus for folding and chipping whole-trees wherein said apparatus includes; a barky whole-tree infeed means, a bark removal means located adjacent to said infeed means wherein said bark removal means includes a plurality of toothed rollers having a nip such that teeth from one of the plurality of rollers are positioned in an area between teeth of the other of the plurality of rollers;
    removing bark from said whole-tree in said bark removal means;
    transferring said debarked whole-tree to a whole-tree chipping means;
    transferring debris from said debarked whole-tree to a debris collection means; and
    chipping said whole-tree.

11. The method, as in claim 10, wherein said rollers are rotated at a speed of at least 200 RPM.

12. The method, as in claim 11, wherein said barky whole-tree is fed into said infeed means at a throughput rate that maintains crack propagation in said whole-tree which is being processed with speed of said rollers being matched to a size of said rollers to maintain a desired feet per minute throughput rate.

* * * * *